United States Patent
Brooks

(10) Patent No.: US 11,381,683 B2
(45) Date of Patent: *Jul. 5, 2022

(54) SYSTEM, DEVICE, AND METHOD OF PERFORMING DATA ANALYTICS FOR ADVISING A SALES REPRESENTATIVE DURING A VOICE CALL

(71) Applicant: SalesBoost, LLC, Plano, TX (US)

(72) Inventor: Margaret L Brooks, Plano, TX (US)

(73) Assignee: SalesBoost, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,151

(22) Filed: Sep. 16, 2020

(65) Prior Publication Data

US 2020/0412875 A1 Dec. 31, 2020

Related U.S. Application Data

(63) Continuation of application No. 16/440,729, filed on Jun. 13, 2019, now Pat. No. 10,812,656.

(51) Int. Cl.
| | |
|---|---|
| *H04M 1/64* | (2006.01) |
| *H04M 3/51* | (2006.01) |
| *G06Q 10/06* | (2012.01) |
| *G10L 25/63* | (2013.01) |
| *G06Q 30/00* | (2012.01) |

(52) U.S. Cl.
CPC ...... *H04M 3/5183* (2013.01); *G06Q 10/0633* (2013.01); *G06Q 30/01* (2013.01); *G10L 25/63* (2013.01); *H04M 2201/40* (2013.01)

(58) Field of Classification Search
CPC ............ H04M 3/5183; H04M 2201/40; G06Q 10/0633; G06Q 30/01; G10L 25/63; H04L 67/306; G06F 17/27

USPC .............................................. 379/88.01–88.4
See application file for complete search history.

(56) References Cited

U.S. PATENT DOCUMENTS

| 7,940,897 B2 | 5/2011 | Khor et al. |
| 10,025,775 B2 * | 7/2018 | Nowson .................. G06F 17/27 |
| 2011/0100199 A1 | 5/2011 | Sugimoto et al. |

(Continued)

FOREIGN PATENT DOCUMENTS

WO  20110158010 A1  12/2011

OTHER PUBLICATIONS

Extended European Search Report issued in corresponding EP Application No. 20179852/7, dated Aug. 20, 2020.

*Primary Examiner* — Md S Elahee
(74) *Attorney, Agent, or Firm* — McGuireWoods LLP

(57) ABSTRACT

A system is provided for interpreting real-time voice communications and generating action plan queues to assist a sales representative during a call. The system includes an analytics module configured to identify voice call data between the sales representative and the other party and select voice impressions in the call for analysis. The analytics module further receives the voice impressions and interpret the impressions, associates at least one attribute and at least one value with each voice impression, and creates a conversation profile based on the at least one attribute and the at least one value associated with the voice impressions. The analytics module further determines action plan queues according to the conversation profile and render the action plan queues to the sales representative during the call.

21 Claims, 5 Drawing Sheets

(56) References Cited

U.S. PATENT DOCUMENTS

| | | |
|---|---|---|
| 2015/0201077 A1 | 7/2015 | Konig et al. |
| 2016/0352902 A1 | 12/2016 | Raanani |
| 2017/0277803 A1 | 9/2017 | Zimmerman et al. |
| 2018/0063278 A1* | 3/2018 | Helled .................. H04L 67/306 |
| 2018/0261219 A1 | 9/2018 | Brooks |
| 2019/0130905 A1 | 5/2019 | Bilgory et al. |
| 2019/0325896 A1 | 10/2019 | Bromand et al. |

* cited by examiner

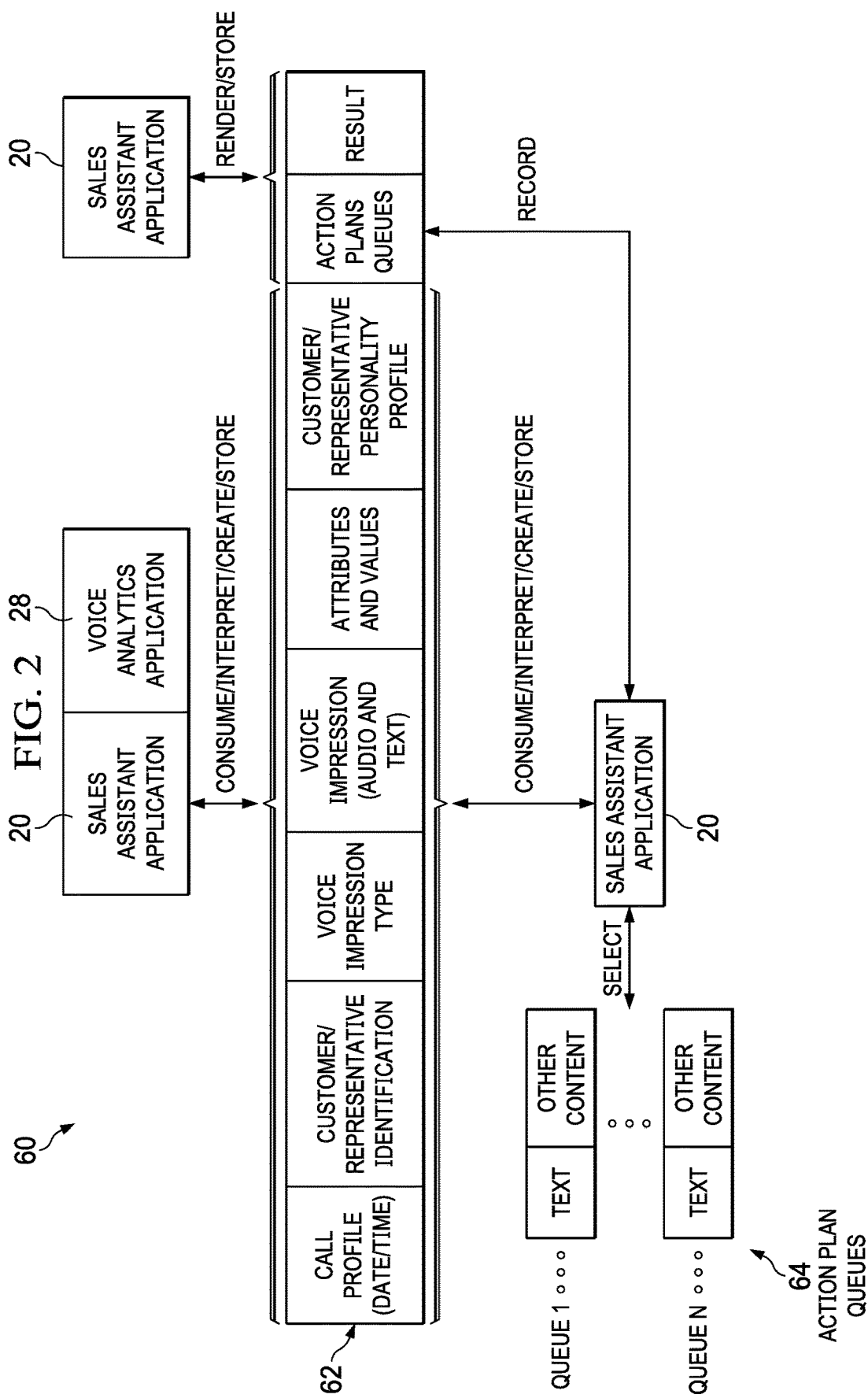

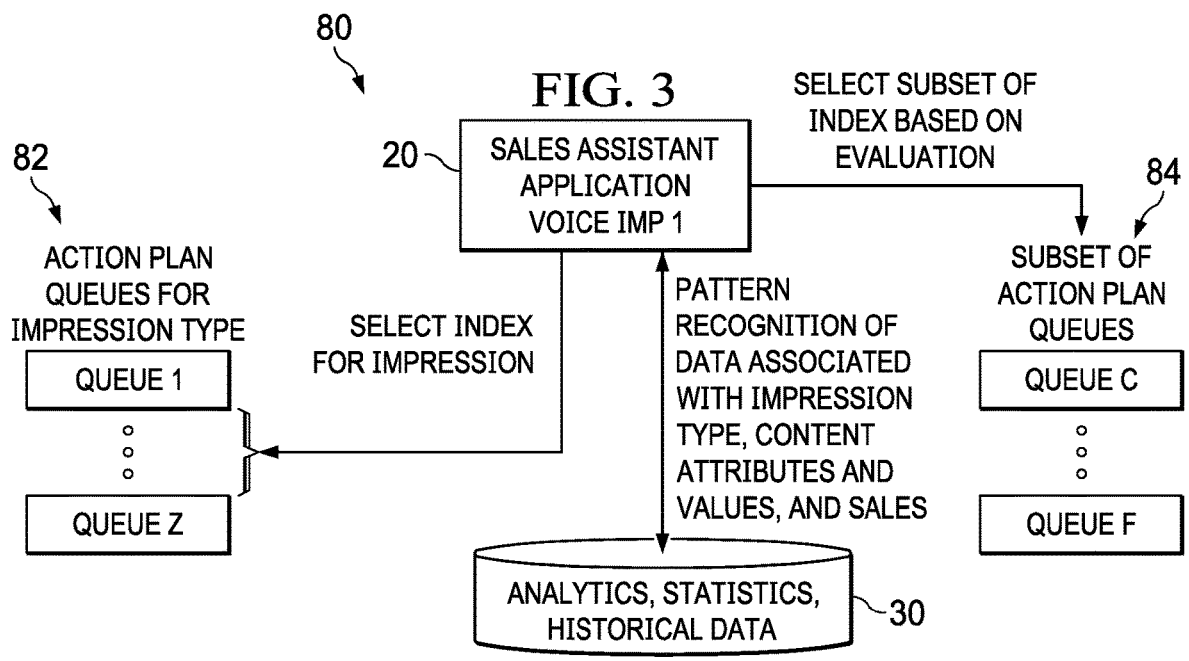
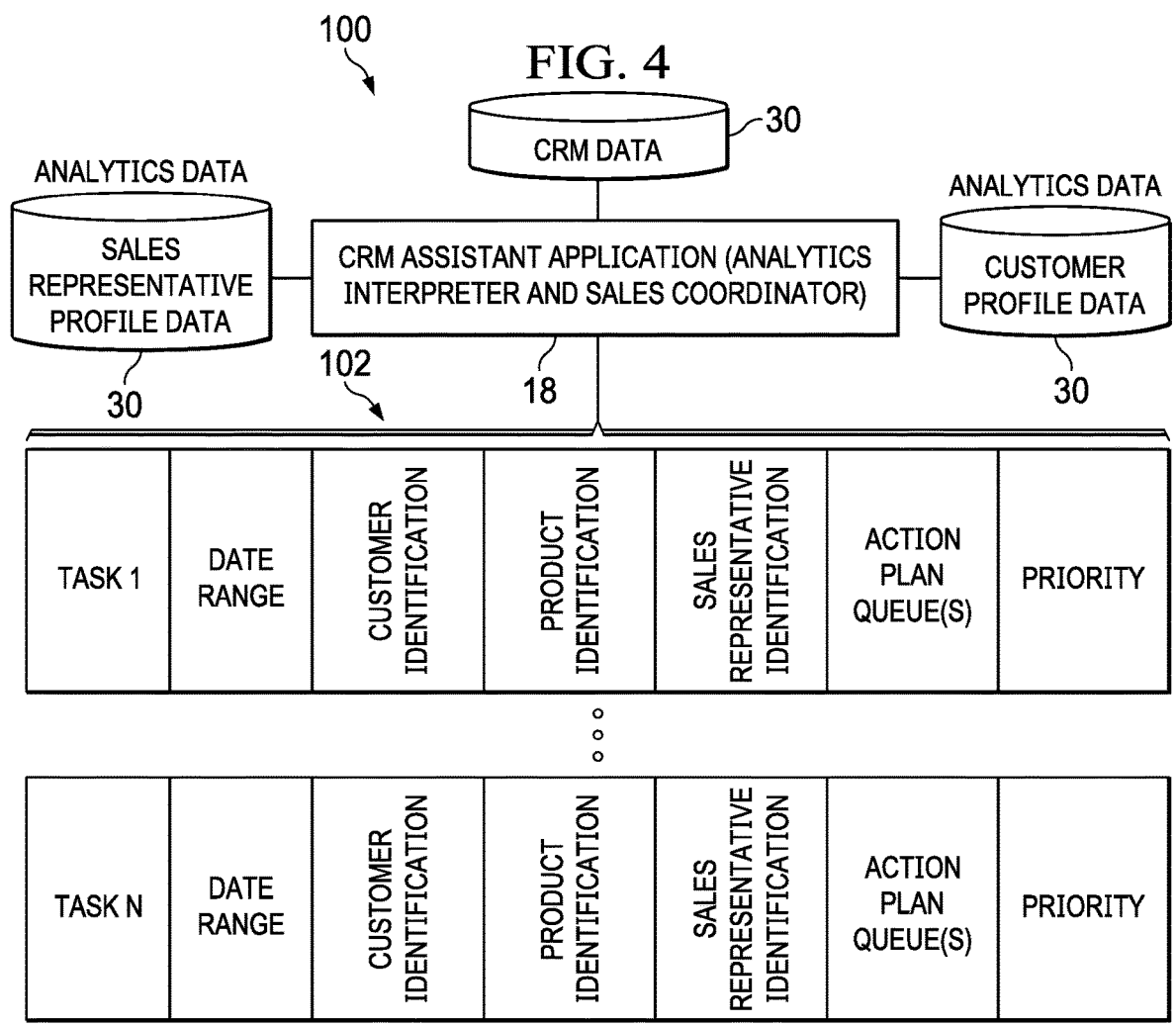

SYSTEM, DEVICE, AND METHOD OF PERFORMING DATA ANALYTICS FOR ADVISING A SALES REPRESENTATIVE DURING A VOICE CALL

TECHNICAL FIELD OF THE DISCLOSURE

The present disclosure relates, in general, to data analytic systems for interpreting voice conversations and other data between calling parties and, in particular, to analytic systems for interpreting and recognizing certain conversational, emotional, and other data patterns between calling parties to an assist sales representative during an actual call.

BACKGROUND

Company's market and sale products to consumers using sales representatives. Sales representatives have unique personality types and their effectiveness as an agent in selling a company's product can be dependent upon how they are trained, their ability to effectively articulate a sell, the customer's personality and mood, the product, as well as many other factors. Unfortunately, during a live real time call between a sales representative and a potential customer, the sales representative can become overwhelmed by all these factors due to the dynamic nature of the sales call. It is not uncommon, therefore, for the sales representative to not always engage the customer in the most effective way due the complexity of these factors. As a result, companies often lose potential customers because of this inability to effectively engage. As such, there is a need for an improved method and system for assisting a sales representative during a live call with a customer.

SUMMARY

In an embodiment, a system for interpreting real-time voice communications between a sales representative and another party is presented. The system comprising: an analytics module configured to: identify voice call data between the sales representative and the other party and select voice impressions in the call for voice analysis; receive the voice impressions and interpret the impressions; associate at least one attribute and at least one value with each voice impression; create a profile based on the at least one attribute and the at least one value associated with the voice impressions; determine at least one action plan queue according to the impression profile; and automatically process the at least one action plan queue and render the at least one action plan to the sales representative during the call.

In yet another embodiment, a device for interpreting real-time voice communications between a sales representative and another party is presented. The device includes: a voice analytics module for receiving voice impressions and interprets the impressions and, in response, associates at least one attribute and at least one value with each voice impression and creates a profile based on the at least one attribute and the at least one value associated with the voice impressions; and a sales analytics module for determining at least one action plan queue according to the profile and automatically sends the action plan to the sales representative during the call.

In the embodiments, the system and device can also record the action plan and profile, wherein the profile includes at least one of content associated with the voice impression, the at least one attribute and the at least one value associated with the attribute. The system and device can also determine the action plan based on at least one of a voice impression type and pattern recognition identified between the profile and other profiles. The action plan queue or queues can include at least one of a text queue and an audio queue wherein each queue can provide instructional advice to the sales representative comprising at least one of recommended emotion level, sales recommendation, and a sales script. The conversation profile can include at least one of an emotions and a personality profile based at least in part on voice inflections of the sales representative and the other party. In addition, the conversation profile further includes at least one of an emotions and a personality profile based at least in part on historical data associated with the other party. The conversation profile can also subject matter associated with the voice impression.

In yet still another embodiment, a method for interpreting real-time voice communications between a sales representative and another party is presented. The method includes: identifying voice call data between the sales representative and the other party; selecting voice impressions in the call for voice analysis; receiving the voice impressions; interpreting the voice impressions; associating at least one attribute and at least one value with each voice impression; creating a conversation profile based on the at least one attribute and the at least one value associated with the voice impressions; determining an action plan according to the conversation profile; and sending, automatically, the action plan to the sales representative during the call.

In the other embodiment, the method of further includes recording the action plan and conversation profile, wherein the conversation profile include at least one of content associated with the voice impression, the at least one attribute and the at least one value associated with the attribute. The action plan can be determined based on at least one of a voice impression type and pattern recognition identified between the conversation profile and other conversation profiles. The action plan can include at least one of a text queue and an audio queue wherein each queue can provide instructional advice to the sales representative comprising at least one of recommended emotion level, sales recommendation, and a sales script. The conversation profile can further include at least one of an emotions and a personality profile based at least in part on voice inflections of the sales representative and the other party. The conversation profile further includes at least one of an emotions and a personality profile based at least in part on historical data associated with the other party.

Additional embodiments, advantages, and novel features are set forth in the detailed description.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 2 is an illustration of a process diagram for generating a sales representative-customer profile record, in accordance with certain example embodiments;

FIG. 3 is an illustration of a sales assistant application module for performing data analytics and generating action plan queues, in accordance with certain example embodiments;

FIG. 4 is an illustration of a CRM assistant application module for interpreting sales representative and customer conversation profile records and coordinating sale representative tasks, according to certain example embodiments;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Figure 1:
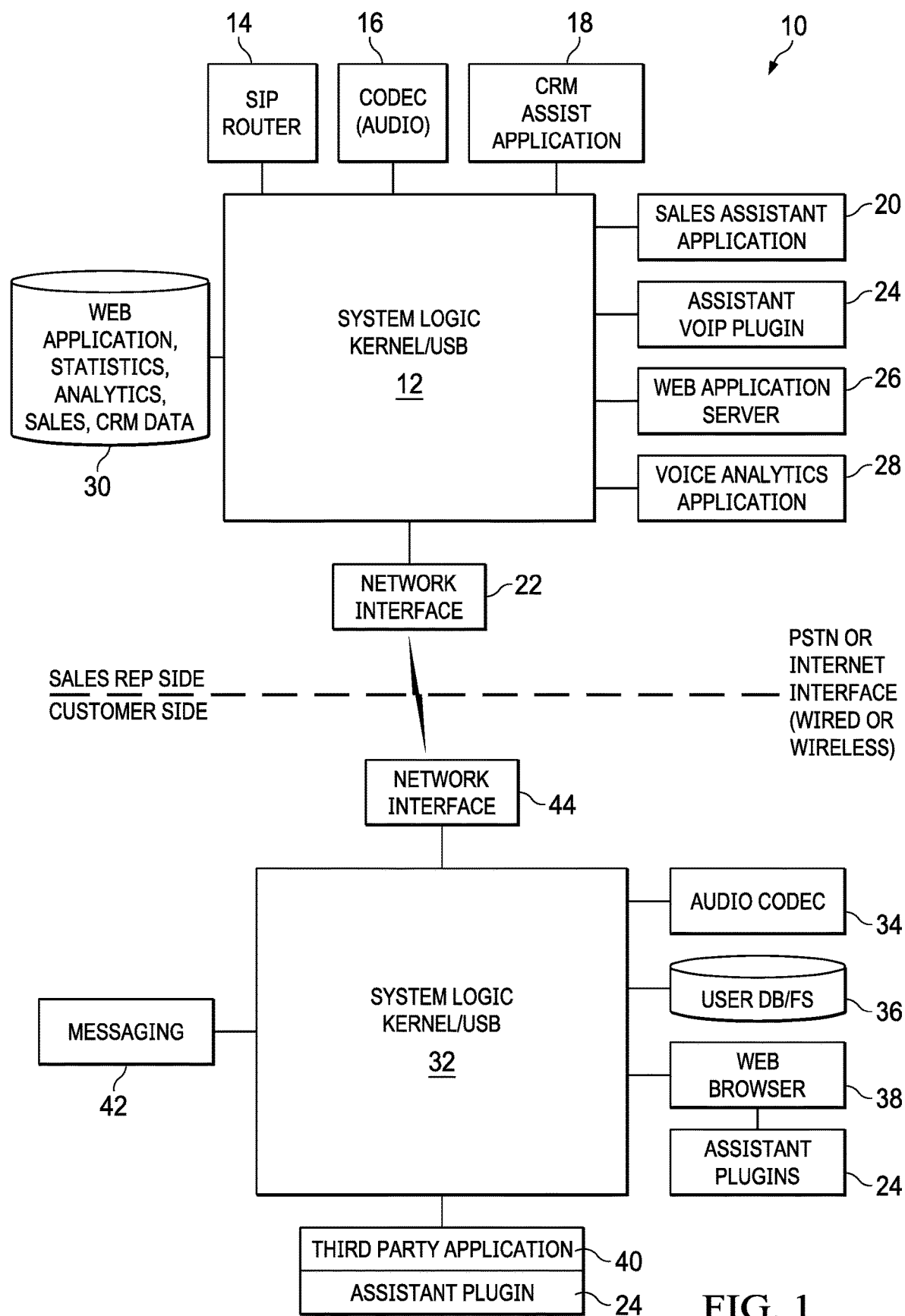
FIG. 1 is an illustration of a system diagram of a data analytics system for assisting sales representatives during a call with a customer, in accordance with certain example embodiments.

Referring now to FIG. 1, illustrated is a system diagram of a data analytics system for assisting sales representatives during a call with a customer, in accordance with example embodiments, denoted generally as 10. The system 10 includes sales representative side and a customer side. The sales representative side can include system logic 12, e.g. kernel and user space applications found available with most OS distributions, SIP router 14, an audio codec 16, a Customer Relationship Management (CRM) assistant application module 18, a sales analytics application module 20, a network interface 22, an assistant VoIP plugin 24, a web application server 26, a voice analytics application 28, and a database 30. The customer side component can include system logic 32, an audio codec 34, database 36, a web browser 38 and assistant plugin 22, $3^{rd}$ party application 42 with assistant plugin 22, messaging platform 44, and network interface 46.

The database 30 can include web application, analytics, sales, action plan queues, and CRM data. The action plan data can include pre-stored and pre-designed message structures that align with certain voice impression types and profiles and can be used to assist a sales representative with a sales call. The CRM data can be product data, product sales data, customer associated data, and sales representative associated data. Analytics data can be statistical and historical data identifying the overall effectiveness of action plan queues, the effectiveness of voice impression types, the effectiveness of sales representatives in relation to the action plan queues, effectiveness of personality types, i.e. sales representative in relation to customer, and relevant product sales data. The database 36 can include customer related data, such as browsing history, message posts, likes and dislikes, and like related information. This information can be used to help better understand the customer.

The system application modules on the sales representative side can be in distributed form. For example, the CRM assistant application module 18 and the sales analytics application module 20 can be on a server, a personal computing device, such as a desktop computer, a smart phone, or tablet, or a combination thereof. The web application server 26 and plugins can be executed from a remote host, i.e. from a centralized service. The SIP router 14 can also be executed from a remote host. Depending on the system architecture, the voice analytics application 28 can be implemented remotely or locally on the user's device. For example, in the case of the SIP router 14, the SIP router 14 can be executed on a separate platform, i.e. a centralized service platform. Alternatively, the SIP router 14 could be executed on the sales representative's device. The sales analytics application module 20 and the voice analytics application module 26 can monitor, select, and interpret VoIP traffic between calling parties and it can do so either executed on the sales representative device or on the centralized host with the SIP router 14. There are obvious advantages in either case relating to security and system load. In the event that the SIP router 14 is not used and a traditional audio codec 16 is used the system 10 functions in a similar manner but using different applications. For example, in the case of SIP, the VoIP data as well as the action plan queues can be integrated within the SIP session without requiring the use of multiple applications. In the other case, a message platform, such as text or mail platform, could be used to deliver the action plan queues over a different session. It should also be noted that the web app server 26 is an embodiment useful when the VoIP client is integrated with the web browser 38 or a $3^{rd}$ party application, which in the latter case may use protocols other than HTTP and HTML.

In a use case scenario, a customer could open a URL for a particular company that uses the assistant applications 18, 20 in its web services. The web application server 26 could render a web page to the customer's web client and integrate the assistant VoIP plugin 24 for use in the web browser 38. The customer could make a VoIP call through the sales representative side which could then be monitored and processed according to the algorithms described herein. Additionally, the call between the sales representative and the other party could be over a traditional PSTN (Public Switched Telephone Network) in which the voice analytics application 28 can monitor and interpret audio traffic from the audio codec 16 independently without the use of the SIP session data so that the sales representative can be assisted with a sales call. In essence, the SIP router 14, VoIP plugin 24, web application server 26 are supporting certain embodiments. In addition, in certain embodiments, the system 10 and the aforementioned system parts can be structured to provide a centralized service for many different companies. In this manner, the analytics data used in database 30 can become much richer and effective.

Referring now to FIG. 2, illustrated is a process diagram for generating a sales representative-customer profile record, in accordance with example embodiments, denoted generally as 60. The sales analytics application 20 can monitor real-time audio traffic between a sales representative and another party, identify and collect relevant data such as voice impressions, sales representative identification, and caller identification, and call profile data. The voice analytics application module 28 can interpret the voice impressions and assign attributes and values to the impressions. In an example use case, the sales analytics application module 20 can identify different types of voice impressions relating to a sales call and the voice analytics application module 28 can assign attributes and values thereto. The sales analytics application module 20 can identify the type of voice impression by either the sales representative providing an indication or from keywords identified within a voice impression. The modules 20, 28 function together to generate the conversation profile record 62.

A sales call can be segmented and categorized as an initial, middle, and final phase, as an example. The voice impressions can be defined as an audio recording of the phase and a text version of conversation for those impressions. The initial phase of the call can be defined as where the sales representative is learning about the customer and/or making the customer feel comfortable. A middle phase of the call can be defined as where the representative is trying to understand the customer's needs. The final phase of the call can be defined as where the sales representative makes a specific product sales pitch. Although, that is merely an example of how the phases could be defined. In an initial phase, the representative may engage the customer in way that puts the customer at ease so that the representative can learn more about the customer. This is a phase where the personality type of the customer can be profiled. A middle phase of the call can include conversation about what the customer is looking for or what the customer may need. For example, a customer may be facing a particular problem such as finding necessary reservations and accommodations for a planned trip and within a certain budget. The final phase could be conversation about related product packages that could address those needs. The voice analytics application module 26 can analyze the voice impression and based on content and inflections therein can assign different attributes and values, see as an example table 1 below, to different conversation sections.

TABLE 1

| Impression (Conversation Piece) | Variable | Low Value (0.00-1.00) | High Value (0.00-1.00) | Ideal Value |
|---|---|---|---|---|
| Sales Rep.: Mr. Smith how is your day going . . . how were the holidays . . . what did you think about the World Series . . . | Happy | 0.51 | 0.54 | 0.51 |
|  | Relaxed | 0.0045 | 0.0046 | 0.0045 |
| Customer: been better, terrible, much better than the holidays, although have a big fishing trip planed | Bored | 0.015 | 0.18 | 0.17 |
|  | Angry | 0.021 | 0.23 | 0.01 |
|  | Excited | 0.268 | 0.269 | 0.265 |
| Customer: I have to book a convention center in Miami but all the best ones are already booked | Worried (In need) | 0.095 | 0.108 | 0.105 |
| Sales Rep.: Perhaps one of our dining facilities in one of our hotels might be able to accommodate | Confident (Sales Effectiveness) | 0.83 | 2.00 | 0.685 |
|  | Excited (Momentum) | 0.32 | 2.00 | 0.265 |
| Customer: That actually sounds like a pretty good idea | Aroused (Energy Level) | 0.31 | 0.38 | 0.375 |
|  | Excited (Momentum) | 0.235 | 0.270 | 0.265 |

The sales analytics application module 20 can analyze the interpreted voice impression and based on the impression type, content of the discussion, and assigned attributes and values predict a personality profile of the customer. Although, the sales analytics application module 20 can augment the impression profile data with other data to create the personality profile. For example, the customers shopping, browsing, and search history can be used. Additionally, message posts and likes and dislikes of message posts can be used to further develop a personality profile. The personality profile can identify a personality type, such as introverted type or an extroverted type. For example, serious and quiet; quiet and reserved; quiet, kind, and conscientious; enthusiastic, idealistic, and creative; creative, resourceful, and intellectually quick; and assertive and outspoken. These are simply examples but based on the content of the impressions, the attributes and values associated therewith, and, optionally, other intelligence data, the sales analytics application module 20 can recognize certain personality types. Furthermore, the system 10 can have a personality profile of the sales representative pre-stored. This can be used in many different ways. One example would be to associate a sales representative with a customer of a compatible personality profile. For example, one personality type may be more effective at initial phase sales and another may be a better closer, final phase.

The sales analytics application module 20 can also analyze the interpreted voice impression and based on the impression type, content of the discussion, assigned attributes and values, and personality profiles determine appropriate action plan queues 64. The sales analytics application module 20 can determine the appropriate action plan queues 64 by recognizing patterns in statistics and historic data structures of previous conversation profiles 62, i.e. the impression types, content, and attributes and values associated therewith, and action plan queues and the results thereof. The results can define whether the impression profile was associated with the sale of product or whether the impression profile resulted in a sales lead, e.g. did the sales representative identify a customer need. The results can be identified and stored automatically by the sales analytics application module 20, e.g. by recognizing certain keywords in an impression. In addition, the sales representative can enter the results of a phase or call session. As another example, in the above impression, the sales analytics application module 20 can interpret the initial phase of the conversation, i.e. the content and attributes and values, and predict the customer as being assertive and outspoken. This can be used by the sales analytics application module 20 to generate action plan queues 64 that, at least in part, can instruct the sales representative what emotions and emotion level, i.e. attributes and attribute values, work with the customer personality type. As another example, in the middle phase of the conversation, the sales analytics application module 20 can recognize key words in the customer statement and instruct the sales representative on what course to take. In the above example, the sales analytics application module 20 could identify relevant hotels in the nearby area that have facilities to accommodate the customer's needs. Other information could be used by the application module 20, such as customer location data, sales data, and CRM data. The sales data and CRM data can have associated keywords that can be used by the application module 20 to make better decision or more relevant decisions.

Referring to FIG. 3, a sales analytics application module 20 for performing data analytics and generating action plan queues, in accordance with example embodiments, denoted generally as 80. In this particular embodiment, the sales analytics application module 20 can identify a set of queues 82 specific to a particular voice impression type, e.g. as initial, middle, or final phase, and based on recognized patterns from statistical and historical data generate a subset of the action plan queues 84 accordingly. As an example, if a call is an initial call between a call representative and a customer and no customer information, such as historical and personal data, is available the sales analytics module 20 can select a set of sub-queues 84 that would help the sales analytics application module 20 develop a personality profile for the customer or just in general establish a good rapport with the customer. Additionally, conversation and inflection patterns recognized during the initial phase of the call could predict a particular customer as being quiet and reserved. The sales analytics application module 20, in response, could select a sub-set of action plan queues 84 for the middle phase of the sales call accordingly. The action plan queues 84 can be conversation subject matter or scripts, instruction on different emotion types and levels, and sales product materials, as an example.

Referring now to FIG. 4, illustrated is a CRM assistant application module 18 for interpreting conversation profile records 62 and coordinating sale representative tasks, according to certain example embodiments, denoted generally as 100. The CRM assistant application module 18 processes the conversation profile records 62, e.g. time and date of the conversation, the voice impression profiles, i.e. content and attributes and values and personality profiles, action plans, and results. The assistant application module 18 can analyze the record data and based on the interpretation create representative tasks 102 identifying representative sales leads and prioritize the tasks based on the interpreted records.

As an example, the assistant application module 18 can select a record and evaluate the result. Based on the indicated result, the CRM assistant application module 18 can evaluate the impression type and attributes and values and prioritize the task based on the likelihood of a sell. The likelihood can be determined by recognizing patterns between a selected record and historical records. For example, if a selected record has an impression type of middle phase, the CRM assistant application module 18 can evaluate other records that have similar middle phase characteristics, such as similar attributes and values and product interests, but also have final phase characteristics with results that are positive. Other factors that the application module 18 can use in determining priority is the time and date of the last call, or series of last calls, conversation data associated with the voice impressions between the customer and either the sales representative or another sales representative, a personality profile of at least one of a sales representative and a customer.

Additionally, the assistant application module 18 can evaluate the personality profile of the customer and match the customer with a compatible sales representative. The assistant application module 18 can identify product identifier or identifier for inclusion in the task. The assistant application module 18 can also identify action plans that can be used in subsequent conversations. The included action plans can be based on the customer's personality profile, the representative's personality profile, the action plans from the records with positive results, or any combination thereof.

Figure 5A:
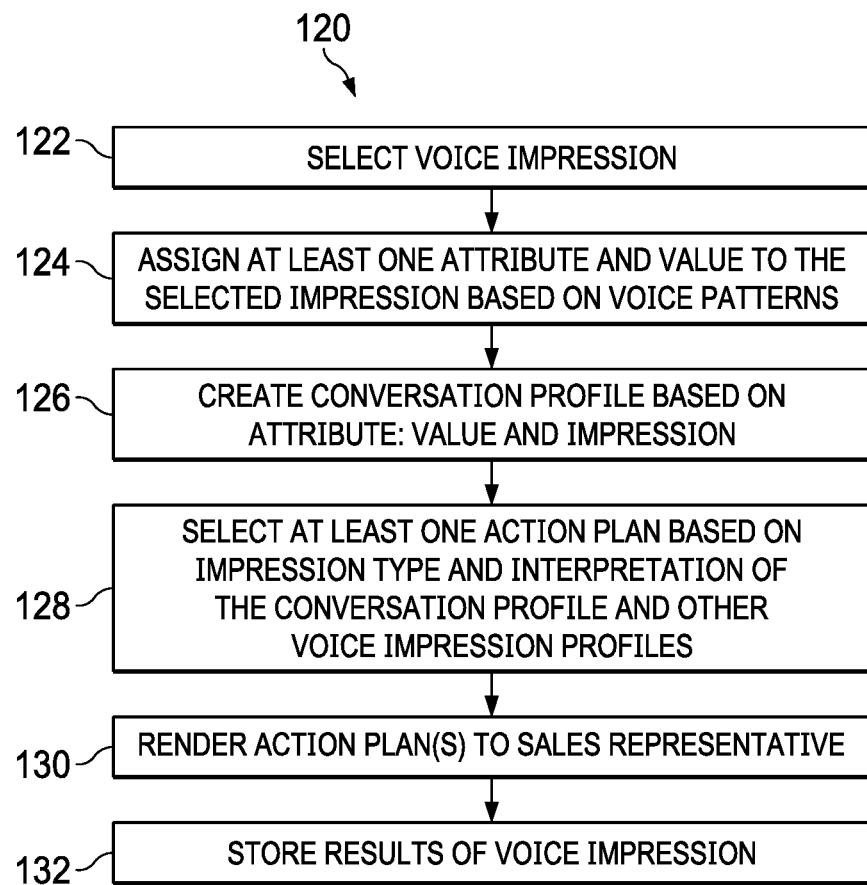
FIG. 5A is an illustration of an algorithm for performing data analytics on a real-time call between a sales representative and another party and assisting the sales representative with an action plan, in accordance with certain example embodiments.

Referring now to FIG. 5A, illustrated is an algorithm for performing data analytics on a real-time call between a sales representative and another party and assisting the sales representative with an action plan, in accordance with certain example embodiments, denoted generally as 120. The algorithm 120 begins at block 122 where a voice impression from a live call is selected for analysis. This can be the initial, middle, or final phase of the call. The sales representative can indicate the phase of the conversation or the algorithm 120 can recognize key words within the impression indicating the phase. At block 124, at least one attribute and value is assigned to the selected impression. The attributes and values can be determined based voice patterns and inflections. At block 126, a conversation profile is created based on the attributes, values, content of the voice impressions, and impression type. At block 128, at least one action plan queue is selected based on the impression type and interpretation of the conversation profile and other voice impression profiles. At block 130, the action plan or plans are rendered to the sales representative. At block 132, the results of the conversation are stored. The sales representative can indicate whether a sale was made or a lead established or the algorithm can detect certain keywords from the impression that indicate such.

Figure 5B:
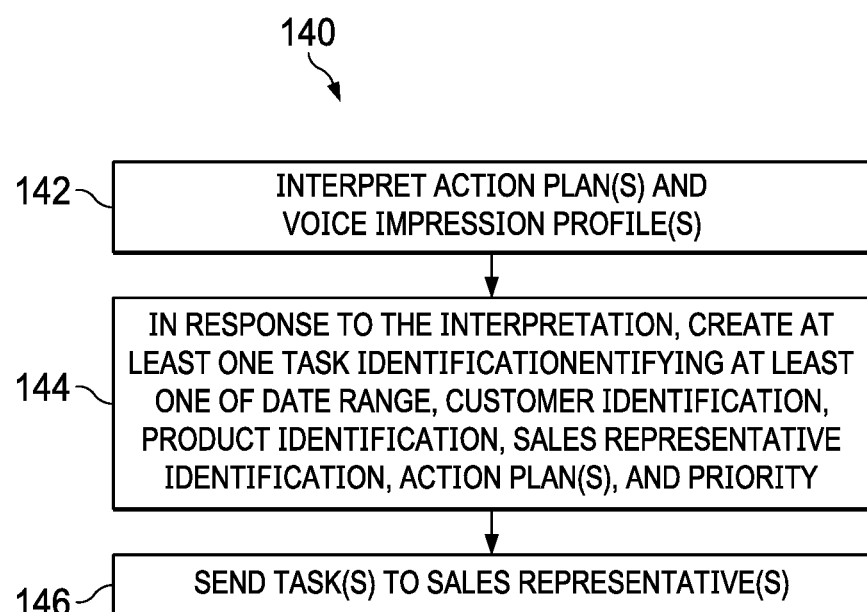
FIG. 5B is an illustration of an algorithm for interpreting conversation profile records and creating sales representative tasks, in accordance with certain example embodiments.

Referring now to FIG. 5B, illustrated is an algorithm for interpreting conversation profile records and creating sales representative tasks, in accordance with certain example embodiments, denoted generally as 140. The algorithm 140 begins at block 142 where the algorithm 140 interprets the conversation profiles in database 30. At block 144, at least one task is created, in response to interpreting at least one of time and date, content, attributes and values, personality profiles, action plans and results of each conversation profile 62. Each task created can identify at least one of a date range for when a sales representative should call a customer, customer identification information as well as personal information, e.g. from a customer personality profile, product ID, sales representative ID, and priority status. Priority information, e.g., could indicate customer's interest in a particular product and, therefore, the urgency of the call. Finally, at block 146 the tasks are sent to the respective sales representative.

Figure 6:
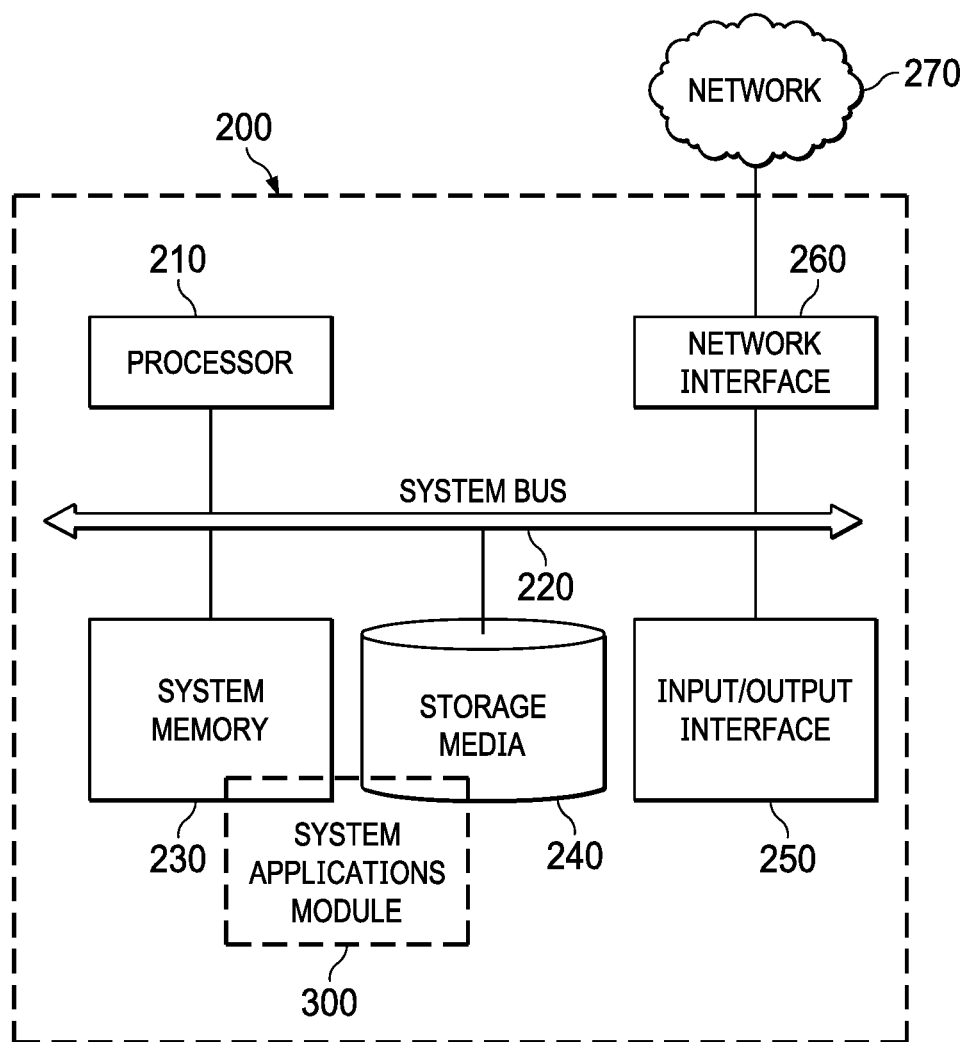
FIG. 6 is a block diagram depicting a computing machine and system applications, in accordance to certain example embodiments.

Referring now to FIG. 6, illustrated is a computing machine 200 and a system applications module 300, in accordance with example embodiments. The computing machine 200 can correspond to any of the various computers, mobile devices, laptop computers, servers, embedded systems, or computing systems presented herein. The module 300 can comprise one or more hardware or software elements, e.g. other OS application and user and kernel space applications, designed to facilitate the computing machine 200 in performing the various methods and processing functions presented herein. The computing machine 200 can include various internal or attached components such as a processor 210, system bus 220, system memory 230, storage media 240, input/output interface 250, a network interface 260 for communicating with a network 270, e.g. cellular/GPS, Bluetooth, or WIFI.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 210 can be designed to execute code instructions in order to perform the operations and functionality described herein, manage request flow and address mappings, and to perform calculations and generate commands. The processor 210 can be configured to monitor and control the operation of the components in the computing machines. The processor 210 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 210 can be a single processing unit, multiple processing units, a single processing core, multiple processing cores, special purpose processing cores, co-processors, or any combination thereof. According to certain embodiments, the processor 210 along with other components of the computing machine 200 can be a software based or hardware based virtualized computing machine executing within one or more other computing machines.

The system memory 230 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 230 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 230. The system memory 230 can be implemented using a single memory module or multiple memory modules. While the system memory 230 is depicted as being part of the computing machine, one skilled in the art will recognize that the system memory 230 can be separate from the computing machine 200 without departing from the scope of the subject technology. It should also be appreciated that the system memory 230 can include, or operate in conjunction with, a non-volatile storage device such as the storage media 240.

The storage media 240 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 240 can store one or more operating systems, application programs and program modules, data, or any other information. The storage media 240 can be part of, or connected to, the computing machine. The storage media 240 can also be part of one or more other computing machines that are in communication with the computing machine such as servers, database servers, cloud storage, network attached storage, and so forth.

The applications module 300 and other OS application modules can comprise one or more hardware or software elements configured to facilitate the computing machine with performing the various methods and processing functions presented herein. The applications module 300 and other OS application modules can include one or more algorithms or sequences of instructions stored as software or firmware in association with the system memory 230, the storage media 240 or both. The storage media 240 can therefore represent examples of machine or computer readable media on which instructions or code can be stored for execution by the processor 210. Machine or computer readable media can generally refer to any medium or media used to provide instructions to the processor 210. Such machine or computer readable media associated with the applications module 300 and other OS application modules can comprise a computer software product. It should be appreciated that a computer software product comprising the applications module 300 and other OS application modules can also be associated with one or more processes or methods for delivering the applications module 300 and other OS application modules to the computing machine via a network, any signal-bearing medium, or any other communication or delivery technology. The applications module 300 and other OS application modules can also comprise hardware circuits or information for configuring hardware circuits such as microcode or configuration information for an FPGA or other PLD. In one exemplary embodiment, applications module 300 and other OS application modules can include algorithms capable of performing the functional operations described by the flow charts and computer systems presented herein.

The input/output ("I/O") interface 250 can be configured to couple to one or more external devices, to receive data from the one or more external devices, and to send data to the one or more external devices. Such external devices along with the various internal devices can also be known as peripheral devices. The I/O interface 250 can include both electrical and physical connections for coupling the various peripheral devices to the computing machine or the processor 210. The I/O interface 250 can be configured to communicate data, addresses, and control signals between the peripheral devices, the computing machine, or the processor 210. The I/O interface 250 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 250 can be configured to implement only one interface or bus technology. Alternatively, the I/O interface 250 can be configured to implement multiple interfaces or bus technologies. The I/O interface 250 can be configured as part of, all of, or to operate in conjunction with, the system bus 220. The I/O interface 250 can include one or more buffers for buffering transmissions between one or more external devices, internal devices, the computing machine, or the processor 220.

The I/O interface 220 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 220 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 200 can operate in a networked environment using logical connections through the NIC 260 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 210 can be connected to the other elements of the computing machine or the various peripherals discussed herein through the system bus 220. It should be appreciated that the system bus 220 can be within the processor 210, outside the processor 210, or both. According to some embodiments, any of the processors 210, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A system for interpreting voice communications, the system comprising:
 a database configured by a processor to have a plurality of action plans, historical conversation profiles, and customer data;
 an analytics module configured by a processor to:
  select voice impressions from voice call data for voice analysis;
  interpret the voice impressions to determine impression type and content of discussion;
  associate at least one attribute and at least one value with each voice impression;
  determine a personality profile based on impression type, content of the discussion, the at least one attribute, and the at least one value;
  create a conversation profile based on the at least one attribute, the at least one value associated with the voice impressions, and the personality profile;
  determine at least one action plan queue according to the conversation profile and recognized patterns in at least one selected from a group comprising statistical data and historical conversation profile; and
  render the at least one action plan for display.

2. The system of claim 1, wherein the analytics module is further configured by the processor to record the action plan and profile, wherein the profile includes at least one of content associated with the voice impression, the at least one attribute and the at least one value associated with the attribute.

3. The system of claim 1, wherein the action plan is determined based on at least one of a voice impression type and pattern recognition.

4. The system of claim 1, wherein the at least one action plan queue includes at least one of a text queue and an audio queue wherein each queue can provide instructional comprising at least one of recommended emotion level, sales recommendation, and a sales script.

5. The system of claim 1, wherein the conversation profile further includes at least one of an emotions and a personality profile based at least in part on voice inflections.

6. The system of claim 1, wherein the conversation profile further includes at least one of an emotions and a personality profile based at least in part on historical data.

7. The system of claim 1, wherein the conversation profile further includes subject matter associated with the voice impression.

8. A method for interpreting voice communications, the method comprising:
 storing a plurality of action plans, historical conversation profiles, and customer data;
 selecting voice impressions from voice call data for voice analysis;
 interpreting the voice impressions to determine impression type and content of discussion;
 associating at least one attribute and at least one value with each voice impression;
 determining a personality profile based on impression type, content of the discussion, the at least one attribute, and the at least one value;
 creating a conversation profile based on the at least one attribute, the at least one value associated with the voice impressions, and the personality profile;
 determining at least one action plan queue according to the conversation profile and recognized patterns in at least one selected from a group comprising statistical data and historical conversation profile; and rendering the at least one action plan for display.

9. The method of claim 8, further comprising recording the at least one action plan queue and conversation profile, wherein the conversation profile include at least one of content associated with the voice impression, the at least one attribute and the at least one value associated with the attribute.

10. The method of claim 8, wherein the at least one action plan queue is determined based on at least one of a voice impression type and pattern recognition identified between the conversation profile and other conversation profiles.

11. The voice analytics system of claim 8, wherein the at least one action plan queue includes at least one of a text queue and an audio queue wherein each queue can provide instructional advice comprising at least one of recommended emotion level, sales recommendation, and a sales script.

12. The method of claim 8, wherein the conversation profile further includes at least one of an emotions and a personality profile based at least in part on voice inflections.

13. The method of claim 8, wherein the conversation profile further includes at least one of an emotions and a personality profile based at least in part on historical data.

14. The method of claim 8, wherein the conversation profile further includes subject matter associated with the voice impression.

15. A device for interpreting real-time voice communications between a sales representative and another party, the device comprising:
    an analytics module configured by a processor to:
        select voice impressions from voice call data for voice analysis;
        interpret the voice impressions to determine impression type and content of discussion;
        associate at least one attribute and at least one value with each voice impression;
        determine a personality profile based on impression type, content of the discussion, the at least one attribute, and the at least one value;
        create a conversation profile based on the at least one attribute, the at least one value associated with the voice impressions, and the personality profile;
        determine at least one action plan queue according to the conversation profile and recognized patterns in at least one selected from a group comprising statistical data and historical conversation profile; and
        render the at least one action plan for display.

16. The device of claim 15, wherein the analytics module is further configured by the processor to record the at least one action plan queue and conversation profile, wherein the profile includes at least one of content associated with the voice impression, the at least one attribute and the at least one value associated with the attribute.

17. The device of claim 15, wherein the action plan is determined based on at least one of a voice impression type and pattern recognition identified between the profile and other conversation profiles.

18. The device of claim 15, wherein the at least one action plan queue includes at least one of a text queue and an audio queue wherein each queue can provide instructional advice comprising at least one of recommended emotion level, sales recommendation, and a sales script.

19. The device of claim 15, wherein the profile further includes at least one of an emotions and a personality profile based at least in part on voice inflections.

20. The device of claim 15, wherein the profile further includes subject matter associated with the voice impression and at least one of an emotions and a personality profile based at least in part on historical data associated with the other party.

21. The device of claim 15, wherein the profile further includes conversation data associated with the voice impression and used by the sales analytics module to determine the at least one action plan queue.

* * * * *